Oct. 10, 1939.        M. KLAVIK        2,175,527

REAR-ENGINE MOTOR VEHICLE

Filed March 15, 1938

Patented Oct. 10, 1939

2,175,527

UNITED STATES PATENT OFFICE 2,175,527

REAR-ENGINE MOTOR VEHICLE

Milos Klavik, Koprivnice, Czechoslovakia

Application March 15, 1938, Serial No. 196,064
In Czechoslovakia April 28, 1937

2 Claims. (Cl. 180—54)

The invention relates to the arrangement of the ventilation of air-cooled engines in vehicles having a streamline body and rear engine. Engines so mounted are normally provided with blowers which draw the air from an aperture or passages provided in the roof or walls of the body, and force it to the engine cylinders and their heads.

The invention concerns more particularly vehicles whereof the body is so low that it is no longer possible to provide in the roof thereof an air passage leading to the blowers. In such a case, air apertures have to be provided in the sides of the body, and the air has to be supplied through lateral passages. This arrangement however encounters difficulties connected with the flow of air along the side walls of the body. In the case of a smooth continuous surface of these walls, the phenomenon normally occurs that the flowing air does not enter the lateral suction apertures under pressure, but for the greater part passes over them, and at high speeds even produces a vacuum in the suction passages which reduces the efficiency of the blower and consequently also of the engine cooling.

This disadvantage is obviated according to the invention by arranging on each side of the body, in front of the rear mudguards, a continuous long vertical slit, the side walls of the body due to their extension behind said slit, gradually entering the interior of the body in such a manner as to form the inner wall of the supply passage. The outer wall of said passage is formed by the extended side wall of the body, said wall merging into the rear wing and into the end part of the body. Due to this arrangement, the air flowing along the side walls of the body in the same streamline as the wall itself, is obliged to pass through the vertical slit into the passage and to the blower at a pressure dependent upon the speed of travel of the vehicle.

Figure 1:
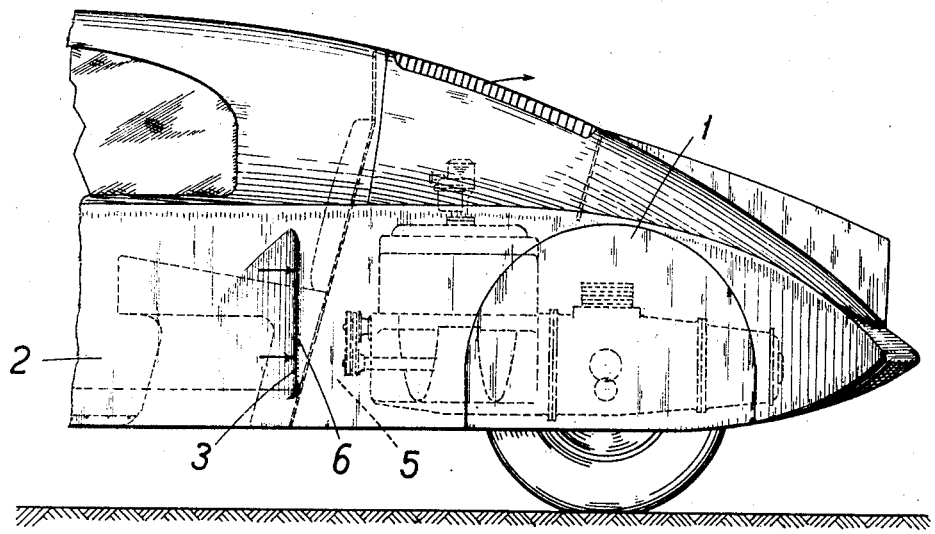

A constructional example of the invention is shown diagrammatically in the accompanying drawing, wherein:

Figure 1 shows an elevation and

Figure 2:
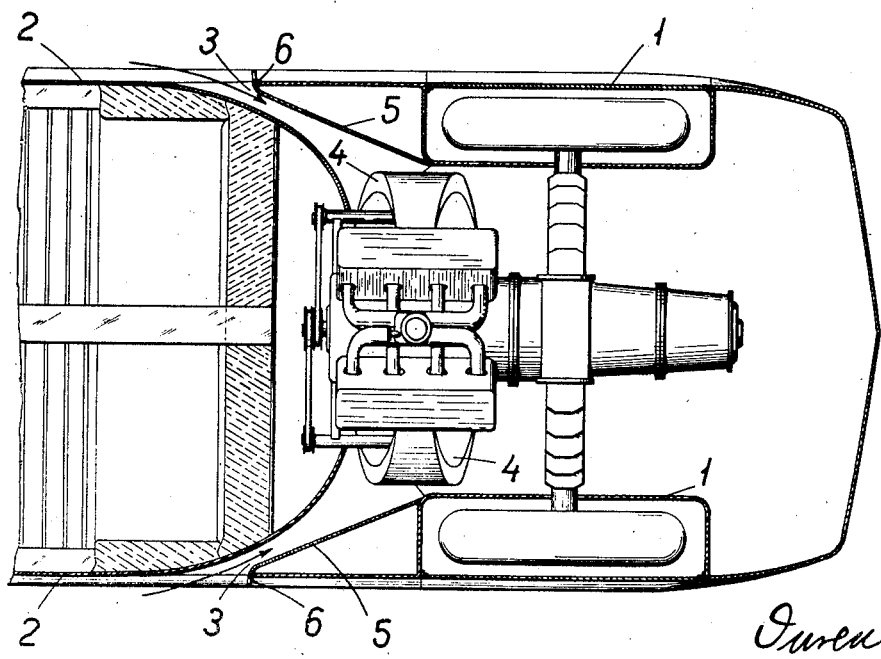

Figure 2 a plan of the principal parts of the body and engine.

As will be seen in Figure 1, the vertical slit 3 is provided in the side wall 2 of the body in front of the rear wing 1. The side wall 2 of the body passes behind said slit gradually inwardly as far as the blower 4, while the outer wall 5 of the passage thus formed merges on the one hand into the wing 1 and on the other into the rear part of the body. As previously stated, this arrangement ensures complete access of the outside air to the blower, and the amount of air can be increased still further by the front edge of the outer wall 5 of the passage being bent outwardly somewhat as shown in Figure 2. This bend 6 at the same time stiffens the sheet metal wall.

I claim:

1. A motor vehicle comprising a stream-line body and an air cooled engine arranged in a compartment at the rear, said body having air passages loading to the engine compartment adjacent the engine arranged on the sides of the body behind the rear windows in the shape of slits, the inner walls of said passages being formed by rearwardly converging side walls of the body and the outer walls forming by its outer surface a continuation of the contour of the body and merging into the rear mud guards and the rear part of the body.

2. A motor vehicle comprising a stream-line body and an air cooled engine arranged at the back, the body having on each side in the side walls cooling air passages extending vertically from adjacent the bottom of the body up to adjacent the rear windows. the outer walls of the air passages being hollow and having the front edge flattened to form a catch for the air.

MILOS KLAVIK.